US008908711B2

(12) United States Patent
Ziegler

(10) Patent No.: US 8,908,711 B2
(45) Date of Patent: Dec. 9, 2014

(54) TARGET ISSUE INTERVALS

(75) Inventor: Michael L Ziegler, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 323 days.

(21) Appl. No.: 13/286,391

(22) Filed: Nov. 1, 2011

(65) Prior Publication Data

US 2013/0107891 A1    May 2, 2013

(51) Int. Cl.
*H04L 12/54* (2013.01)
*H04L 12/46* (2006.01)

(52) U.S. Cl.
CPC ................. *H04L 12/4633* (2013.01)
USPC ........... 370/429; 370/389; 370/412; 370/413; 370/414; 370/230; 370/231

(58) Field of Classification Search
USPC ................. 370/230–235, 428–429, 465, 472, 370/412–413, 417, 419
See application file for complete search history.

(56) References Cited

U.S. PATENT DOCUMENTS

| 5,550,815 | A | * | 8/1996 | Cloonan et al. | 370/396 |
| 5,978,359 | A | * | 11/1999 | Caldara et al. | 370/236 |
| 6,052,368 | A | * | 4/2000 | Aybay | 370/357 |
| 7,126,957 | B1 | * | 10/2006 | Isukapalli et al. | 370/412 |
| 7,433,312 | B2 | | 10/2008 | Yoshihara et al. | |
| 7,593,329 | B2 | | 9/2009 | Kwan et al. | |
| 7,616,570 | B2 | * | 11/2009 | Ronneke et al. | 370/235 |
| 7,675,857 | B1 | * | 3/2010 | Chesson | 370/235 |
| 7,738,473 | B2 | * | 6/2010 | Nielsen | 370/413 |
| 2001/0033581 | A1 | * | 10/2001 | Kawarai et al. | 370/468 |
| 2007/0019650 | A1 | * | 1/2007 | Nielsen | 370/395.4 |
| 2012/0324519 | A1 | * | 12/2012 | Laughlin | 725/95 |

OTHER PUBLICATIONS

Viejo, A. et al., "Secure and scalable many-to-one symbol transmission for sensor networks", http://crises-deim.urv.cat/webCrises/publications/isijcr/COMCOMViejo08.pdf, Mar. 2, 2008, pp. 2408-2413:vol. 31.

Zhu et al., "Joint routing rate allocation for multiple video streams in ad-hoc wireless networks", http://www.stanford.edu/~zhuxq/publication/pv2006.pdf, Oct. 7, 2008, p. 727-736: vol. 7.

Zhang, Q. et al., http://v-scheiner.brunel.ac.uk/bitstream/2438/2545/1/Sender-adaptive and receiver-driven layered multicast for scalable video over the internet.. Apr. 2005, pp. 482-495:vol. 15,Issue:4.

* cited by examiner

*Primary Examiner* — Hassan Kizou
*Assistant Examiner* — Amy Ling

(57) ABSTRACT

Techniques for using target issue intervals are provided. Request messages may identify the size of a data packet. A target issue interval may be determined based on the request messages. The target issue interval may be used to insert a delay between sending subsequent request messages.

16 Claims, 12 Drawing Sheets

| TARGET ISSUE INTERVAL (410) | DELAY PER 64 BYTES (420) | EFFECTIVE BANDWIDTH (430) | |
|---|---|---|---|
| 0 | 4 ns | 128 Gbit/sec | * ← 470 |
| 1 | 8 ns | 64 Gbit/sec | |
| 2 | 16 ns | 32 Gbit/sec | |
| 3 | 32 ns | 16 Gbit/sec | ** ← 460 |
| 4 | 64 ns | 8 Gbit/sec | |
| 5 | 128 ns | 4 Gbit/sec | |
| 6 | 256 ns | 2 Gbit/sec | *** ← 450 |
| 7 | 512 ns | 1 Gbit/sec | |
| 8 | 1024 ns | 500 Mbit/sec | |
| 9 | 2048 ns | 250 Mbit/sec | |
| 10 | 4096 ns | 125 Mbit/sec | |
| 11 | 8192 ns | 62.5 Mbit/sec | |
| 12 | 16384 ns | 31.25 Mbit/sec | |
| 13 | 32768 ns | 15.63 Mbit/sec | |
| 14 | 65536 ns | 7.81 Mbit/sec | |
| 15 | 131072 ns | 3.9 Mbit/sec | |

440

\*    BASE 100G PORT

\*\*    BASE 10G PORT

\*\*\*    BASE 1G PORT

FIG. 4

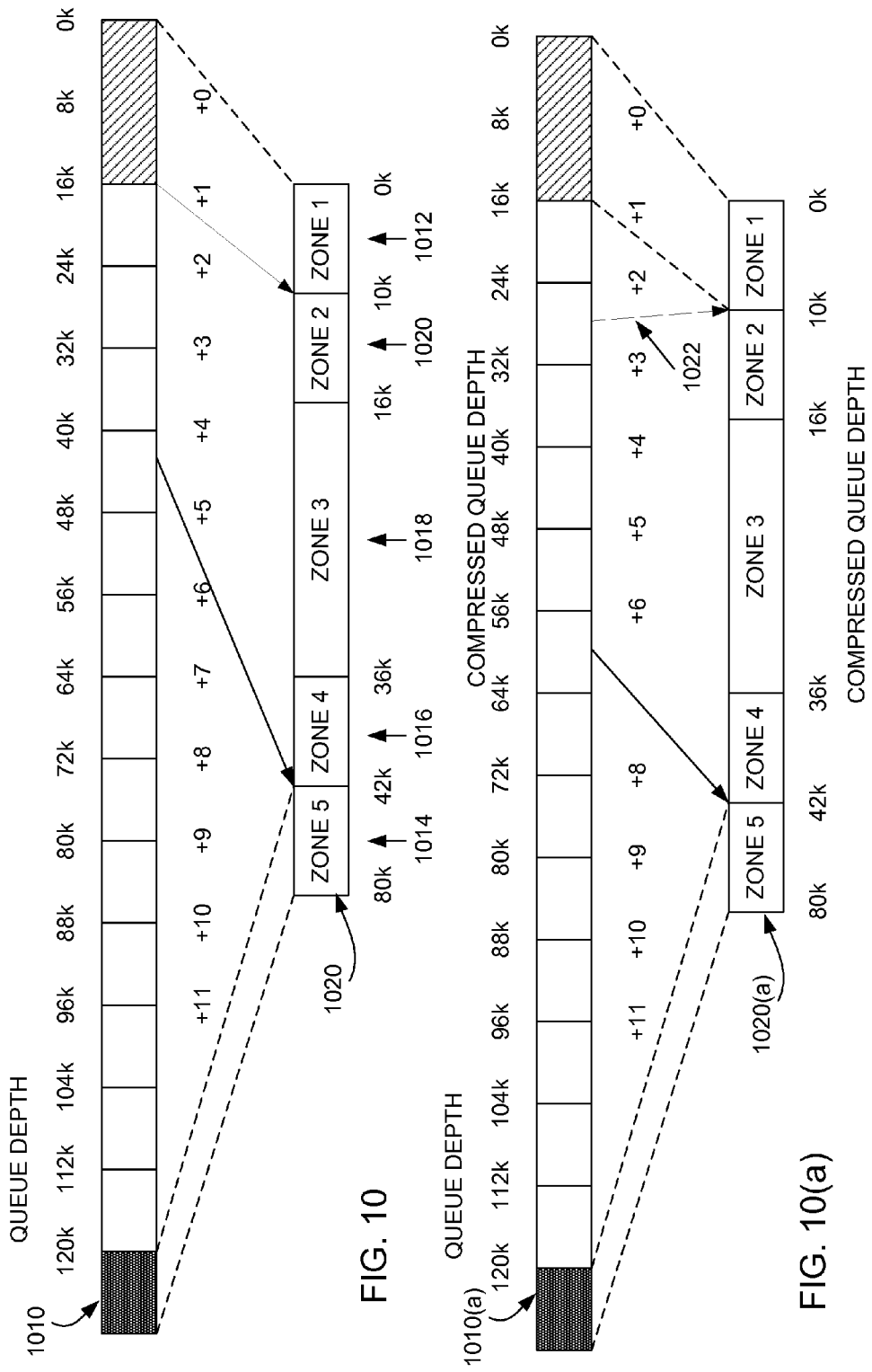

TARGET ISSUE INTERVALS

BACKGROUND

Data networks are used to allow many types of electronic devices to communicate with each other. Typical devices can include computers, servers, mobile devices, game consoles, home entertainment equipment, and many other types of devices. These types of devices generally communicate by encapsulating data that is to be transmitted from one device to another into data packets. The data packets are then sent from a sending device to a receiving device. In all but the simplest of data networks, devices are generally not directly connected to one another.

Instead, networking devices, such as switches and routers, may directly connect to devices, as well as to other networking devices. A network device may receive a data packet from a device at an interface that may be referred to as a port. The network device may then forward the data packet to another port for output to either the desired destination or to another network device for further forwarding toward the destination. The bandwidth available in a network device for such data transfer may be finite, and as such it would be desirable to make such transfers as efficient as possible.

BRIEF DESCRIPTION OF THE DRAWINGS

FIG. 4 depicts an example of Target Issue Intervals.

FIG. 10 depicts an example of a compressed output queue.

DETAILED DESCRIPTION

Figure 1:
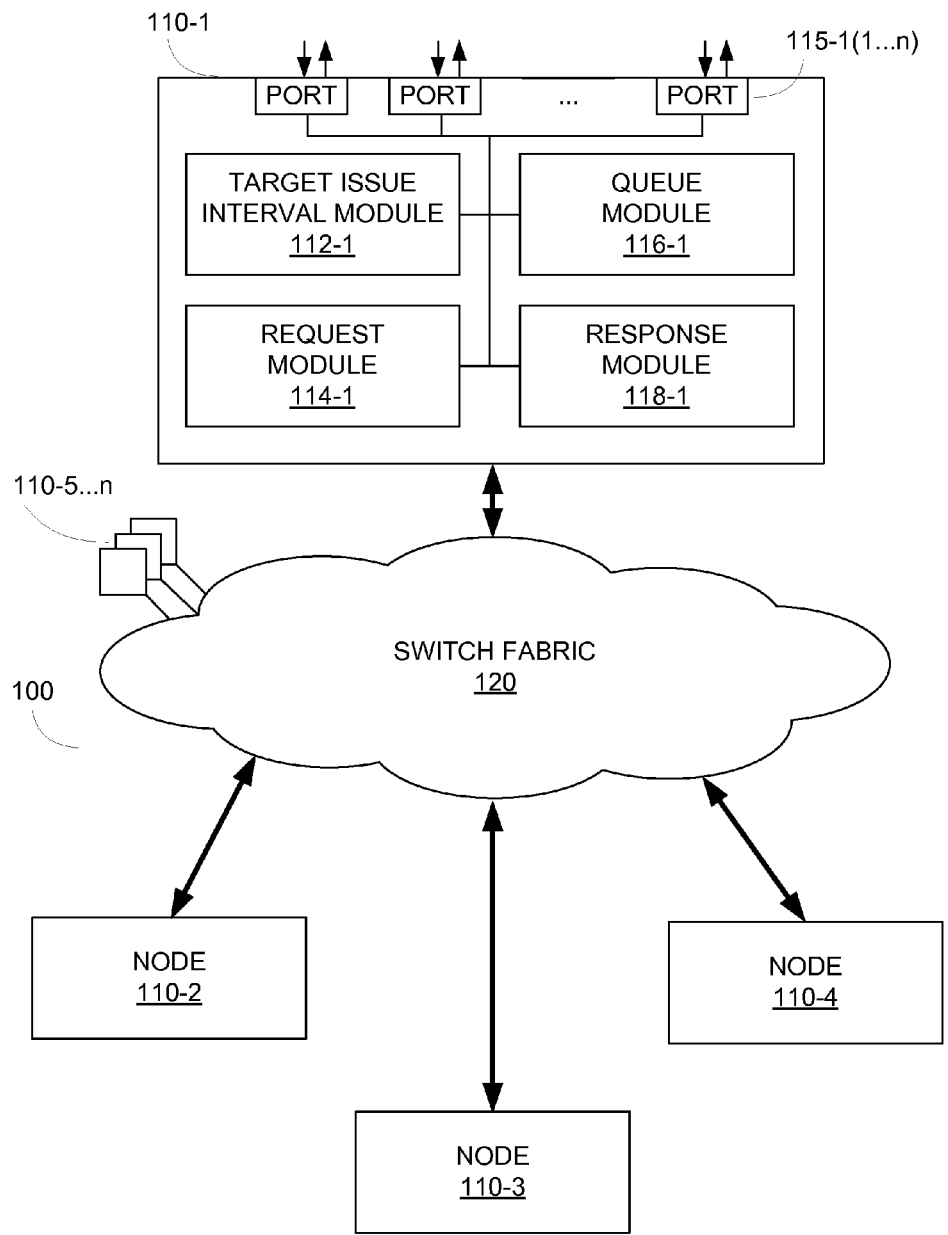
FIG. 1 is a high level block diagram of an example of a network device.

A network device may receive data packets from a plurality of sources and will route those data packets to the desired destination. The network device may receive the data packets through ports that are connected to external packet sources. The network device may then route those data packets to other ports on the network device through a switch fabric. The switch fabric allows for packets to be sent from one port on the network device to a different port. The network device may then output the data packet on a different port.

Each port may operate at a certain data rate. For example, a port may operate at 1 Gbit/sec, 10 Gbit/sec, or 100 Gbit/sec. The data rate at which a port operates determines how fast the port may receive and/or transmit data. Thus, a port with a data rate of 10 Gbit/sec may output data at that rate or below. Data packets may be received from an external source through a port on a source node. The data packets may be organized into streams. For purposes of this description, a stream is a set of data packets that may all be going to the same output port on a destination node. However, it should be understood that each source node may have multiple streams destined for different ports on the same or different destination nodes. Furthermore, a source node may have multiple streams that are destined for the same output port on a destination node. For example, the streams may serve different classes of data packets.

A problem may arise when the rate of data packets being sent to an output port exceeds the rate at which data may be output from the port. For example, if an output port operates at 10 Gbit/sec and two streams are sending data to that output port at 10 Gbit/sec each, the combined rate of data coming in is 20 Gbit/sec. This rate of input exceeds the rate at which data can be output from the port, thus resulting in a backup at the output port. Each output port may maintain an output queue in which data may be buffered while waiting to be transmitted from the port. However, the buffer size may be finite and if the input rate exceeds the output rate for a long enough period of time, the buffer may become full.

Example embodiments described herein provide for techniques to overcome these problems and others. A source node may send request messages which identify a size of a data packet to be sent to a port on a destination node. Based on the impact to the output buffer of adding a packet of the identified size, the destination node may determine a Target Issue Interval (TII) which may be used to determine the rate at which a stream should offer data packets for addition to the buffer. As the output buffer, also referred to as an output queue, begins to fill, the TII value may be modified such that the streams offer less data. Conversely, as the output queue drains, the TII value may be modified such that the streams offer greater amounts of data. Furthermore, the amount of data offered by a stream is normalized, such that each stream may be given an approximately equal share of the space available in the output queue.

FIG. 1 is a high level block diagram of an example of a network device. The network device 100, such as a switch or router, may implement the example techniques described herein in order to regulate the rate at which data is sent to an output port. The network device may include a plurality of nodes 110-1 . . . n. For purposes of clarity, only one node is shown in detail in FIG. 1, however it should be understood that there may be any number of nodes. Furthermore, all nodes are capable of both sending and receiving packets, and may be doing so simultaneously. However, for ease of description, FIG. 1 will be described in terms of a destination node 110-1 which may receive data packets from other nodes, referred to as source nodes. The destination node may inform the source nodes of the rate at which data may be sent. The source nodes may respond by conforming the rate at which data is sent to the destination node to the specified rate. It should be understood that in operation, a node may act as both a source node and a destination node at the same time for different data packets or even for the same packet.

A node 110-1 may include a plurality of ports 115-1(1 . . . n). Ports 115-1 may be used to connect to external sources of data packets, such as computers, servers, or even other network devices. The node 110-1 may receive data packets from these external sources through the ports. The node may also send data packets to external devices through the ports. The number of ports that exist on a node may be determined by the design of the network device. For example, in some modular switches, capacity may be added by inserting an additional line card containing 4, 8, 16, or 32 ports. The line card may also contain a node chip to control the data packets sent to and received from the ports. In some Cases, depending on the number of ports included on a line card, more than one node chip may be required. However, for purposes of this explanation, a set of ports may be controlled by a single node chip.

The node chip, which may simply be referred to as a node, may typically be implemented in hardware. Due to the processing speed requirements needed in today's networking environment, the node may generally be implemented as an application specific integrated circuit (ASIC). The ASIC may contain memory, general purpose processors, and dedicated control logic. The various modules that are described below may be implemented using any combination of the memory, processors, and logic as needed.

The node 110-1 may include a Target Issue Interval (TII) module 112-1, a request module 114-1, a queue module 116-1, and a response module 118-1. The TII module may be used to maintain a TII value for every output port within the networking device. When a node is acting as a source node, the TII module may be used to determine the TII value currently in effect for an output port. The TII value may be used to determine the rate at which a stream may send data to that output port. Node 110-1 may also include a request module 114-1. The request module may be used by a source node to inform a destination node that a data packet is available to be transferred to the destination node. The request module may issue a request message which contains the size of the data packet that is being offered to an output port of a destination node. The request message does not transfer the actual data packet, but rather just informs the destination that a packet is available. At that point, if the destination chooses to accept the request, the data packet may be sent from the source node to the destination node. In some implementations, the source node may initiate sending the data packet, while in other implementations, the destination node initiates the transfer. The techniques described herein are applicable regardless of which node initiates the transfer of the data packet.

Node 110-1 may also include a queue module 116-1. The queue module may be used to establish output queues for each port contained on the node. For example, the queues may be implemented as First In First Out (FIFO) queues. As data packets are received by a destination node, the packets may be added to an output queue for eventual transmission out of the network device through one of the output ports. The queue module may also maintain a TII value for each output port on the node based on the depth of the output queue. Node 110-1 may also include a response module 118-1. The response module may be used to respond to request messages. The response module may receive a request message and first determine if the request message will be accepted. The response module may send a response indicating if the request message is accepted or refused. Also included in the response message may be an indication of the TII value for the output queue that was the target of the request message. The TII value may be received from the queue module. When a response message is received by a source node, the included TII value may be used to update the TII value stored in the TII module. As will be explained in further detail below, the TII value may determine the rate at which a source node may issue request messages.

System 100 may also include a switch fabric 120. The switch fabric may receive messages from the nodes and route those messages to their intended destination. Each node may have one or more interfaces to the switch fabric, and it is through the switch fabric that the nodes may communicate with each other.

In operation, data packets may be received by a node, which will be referred to as a source node, for transmission to a destination node, for eventual output on a port of that destination node. A source node may receive packets from external sources through the ports. The source node may organize these packets into streams. For purposes of this description, a stream may be a set of packets that are all destined to be output on the same port of a destination node. However, it should be understood that all data packets from a given source node that are intended for the same output port of a destination node may not all be included in the same stream. A source node may have multiple streams that each contain packets that are to be output on the same port of a destination node. Furthermore, as mentioned above, there may be many source nodes, each containing their own streams. Thus, for a given output port on a destination node there may be streams of packets arriving from different source nodes. Furthermore, there may be multiple streams arriving from the same source node.

When a data packet is available to be sent to an output port of a destination node, the source node may send a request message. Included in the request message may be a size of the data packet. The source node may issue request messages at a rate determined by the TII, which may be retrieved from the TII module. The rate of issuance of request messages may determine the amount of data that is being sent from the stream to a port on the destination node, as will be described in further detail below.

Upon receipt of the request message, the destination node may determine the depth of an output queue that is associated with the output port that is the target of the request message should a data packet of the size identified in the request message be added to the output queue. Based on the determination of the resulting depth of the queue, the destination node may determine a TII value for the output port, and include this TII value in a response message returned to the source node that sent the request message.

Upon receipt of the response message, the source node may update the TII module to reflect the TII value that was communicated in the response message. At some point after the receipt of the response message, the data packet may be sent from the source node to the destination node. As mentioned above, the transfer of the data packet may be initiated by either the source or the destination node and the techniques described herein are not dependent on which node initiates the data transfer. Once the data packet is received by the destination node, it may be added to an output queue associated with the output port to which the data packet is being sent.

Figure 2:
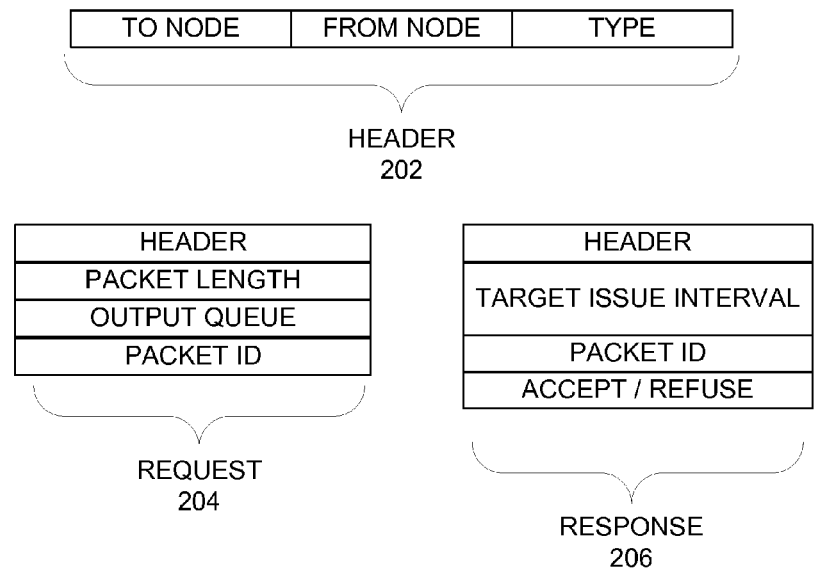
FIG. 2 depicts an example of message content and structure that may be used in an embodiment.

FIG. 2 depicts an example of message content and structure that may be used in an embodiment. The messages described in FIG. 2 are an example of those that may be used with the system as described in FIG. 1. In this example implementation, each message includes a header 202. The header may include a 'To Node' field which identifies the node that the message is intended for. Also included is a 'From Node' field which identifies the node that sent the message. The node identifications may be used by the switching fabric to properly transfer messages from the sending node to the intended recipient node. In addition, the header may also include a 'Type' field which is further used to identify the contents and structure of the message when received.

In the present example implementation there are two basic message types that are used to facilitate the transfer of data packets in a stream from the source node to the destination node. Each message type includes the header 202 which will not be described further, The first message type is the request message 204. The request message may be used. by a source node to notify a destination node that a data packet is ready to be transferred from the source node to the destination node, The request message may include a 'Packet Length' field which includes the length. of the data packet that is being offered. The request message may include an 'Output Queue' field, The 'Output Queue' field may be used to identify an output queue, which in turn determines an output port, on the destination node to which the data packet is to be added. The request message 204 may also include a 'Packet ID' field to identify the data packet. The use of the 'Packet ID' field will be described below.

The second message type is the response message 206. The response message may be used by a destination node to notify the source node that a request message has been received. The response message may include a 'Packet ID' field that identifies the data packet as described with respect to the request message. When the source node receives the response message, the 'Packet ID' field may be used to identify the data packet that is associated with the response. Identifying the data packet in turn identifies the output queue that has sent the response. In some example implementations, the output queue sending the response may be identified in the response message.

The response message may also include a 'Target Issue Interval' field. The 'Target Issue Interval' field may be used by the destination node to inform the source node of the rate of data transfer the output queue desires. The Target Issue Interval will be described in further detail below, however for purposes of description, the TII identifies the rate at which the responding output queue is willing to accept data. The response message may also include an 'Accept/Refuse' field. The 'Accept/Refuse' field may be used by the destination node to inform the source node if the request message associated with a 'Packet ID' is being accepted or refused.

Figure 3:
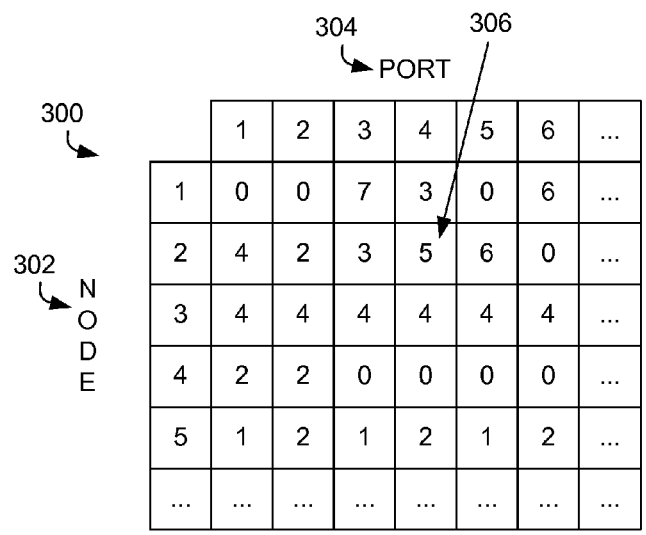
FIG. 3 depicts an example of a Target Issue Interval data structure.

FIG. 3 depicts an example of a Target Issue Interval data structure 300. A TII data structure may be maintained on each node. The TII data structure may be used to store the current TII value for every output port, and hence output queue, within the network device. In the example implementation shown in FIG. 3, the TII data structure is a table. The node axis 302 of the table may identify every possible node in the network device. The port axis 304 may identify every port on each identified node. Thus, the value stored at the intersection of a node and a port may be the TII currently in effect for that particular port on that particular node. For example, TII 306 may identify the TII for the fourth port on the second node as currently being the value 5. The various values of the TII will be described in further detail below.

The TII data structure may be maintained by the TII module 112. Whenever a response message, such as a response message 206 described above, is received, the TII value may be extracted from the response and the value added to the TII data structure. It should be understood that the TII data structure may be updated upon every response, regardless of the stream that sent the request that resulted in the response. As explained above, multiple streams on a source node may be sending data packets to a single output queue. As such, each stream will issue separate requests and receive separate responses. However, updating of the TII table is independent of the streams. Whenever a response message containing a TII is received, the TII data structure may be updated.

FIG. 4 depicts an example of Target Issue Intervals (TII). As mentioned above, the TII determines the rate at which a stream may send request messages to an output queue. The TII may determine the rate at which a stream is expected to send data to an output queue. The TII may be represented as a delay normalized to a defined number of bytes, such that the amount of data offered by a stream remains approximately the same, regardless of the size of the data packets within the stream. This normalization allows for a bandwidth fair allocation of available bandwidth. The bandwidth fair allocation will be described in further detail below.

In some example implementations, the correspondence between the TII values and the delay may be determined at design time. In other example implementations, the correspondence may be configurable parameters that are set by a system administrator when configuring the network device. Although shown as a table, it should be understood that any other data structure may be used. Regardless of how the values are set or in what type of structure the values are stored, every node within the networking device may maintain the information regarding TII values.

For each TII value 410, there may be an associated per byte delay 420. As shown in FIG. 4, the per byte delay may be specified for a certain number of bytes, such as 64 bytes. For every 64 bytes of data in a packet for which a request was sent, the stream may delay the number of seconds specified before sending another request message. For example, if a stream has sent a request message for a 64 byte packet and the current TII interval for the output queue (as determined by a data structure such as the one depicted in FIG. 3) is set to a value, the stream will delay the determined number of seconds before sending a subsequent request message. Each TII value may be associated with an effective bandwidth 430. For example row 440 in FIG. 4 specifies that a TII value of 4 results in a 64 nanosecond (ns) delay before sending the next request message. If a stream is sending 64 byte packets, the stream will delay 64 ns between each subsequent request. In other words, the stream is offering data packets at a rate of 1 packet per 64 ns, which results in an effective bandwidth of 8 Gbit/sec.

In a case where larger data packets are being sent, the delay may be greater. For example, if a stream is sending data packets that are 2 Kilobytes (Kbyte) long, there will be a delay of 16,384 ns between request messages, given the same TII value of 4 described above. The reason for this is that a 2 Kbyte packet, when divided by 64 bytes, comes out to 32. Because the stream inserts a delay per 64 bytes, the stream will insert a delay of 32*64 ns=16,384 ns between requests. In other words, the stream is offering data packets at a rate of 1 packet per 16,384 ns, which again results in an effective bandwidth of 8 Gbit/sec. The bandwidth fair aspects of the TII are described in further detail below.

The TII table may also maintain base TII values for each type of output queue. As mentioned above, output ports, and their corresponding output queues, may operate at various data rates. Some example output rates include 1 Gbit/sec, 10 Gbit/sec, and 100 Gbit/sec. The TII values determine the rate at which a stream may send request messages, and thus data, to an output queue. However, it may not be desirable to allow a stream to send data to an output queue at a rate that greatly exceeds that which can be supported for extended periods of time. For example, if an output queue is operating at 1 Gbit/sec, it may be desirable to limit the input to that queue to 2 Gbit/sec or less. Although a 2 Gbit/sec rate exceeds the capacity of the output queue, allowing such a rate for a period of time may allow for sufficient data to be added to the queue, thus ensuring the output queue is not starved for data. Although the techniques described herein are able to handle such an inrush of data without these limits, it may be desirable to address this case prior to it occurring.

For each data rate supported by an output queue, there may be specified a base TII value. As shown, base TII values have been specified for 1 G 450, 10 G 460, and 100 G 470 ports. The system may limit an output queue to TII values that are at or above the base value. For example, an output queue operating at 10 Gbit/sec may be limited to TII values of 3 or above. As such, the output queue may only request data at a rate of 16 Gbit/sec or below. Such a restriction may be useful because it may be more efficient to restrict an output queue to a data rate close to that which it may actually have a chance of supporting. However, it should be understood that the techniques described herein are not dependent, and are capable of operating, without the base TII values.

Figure 5:
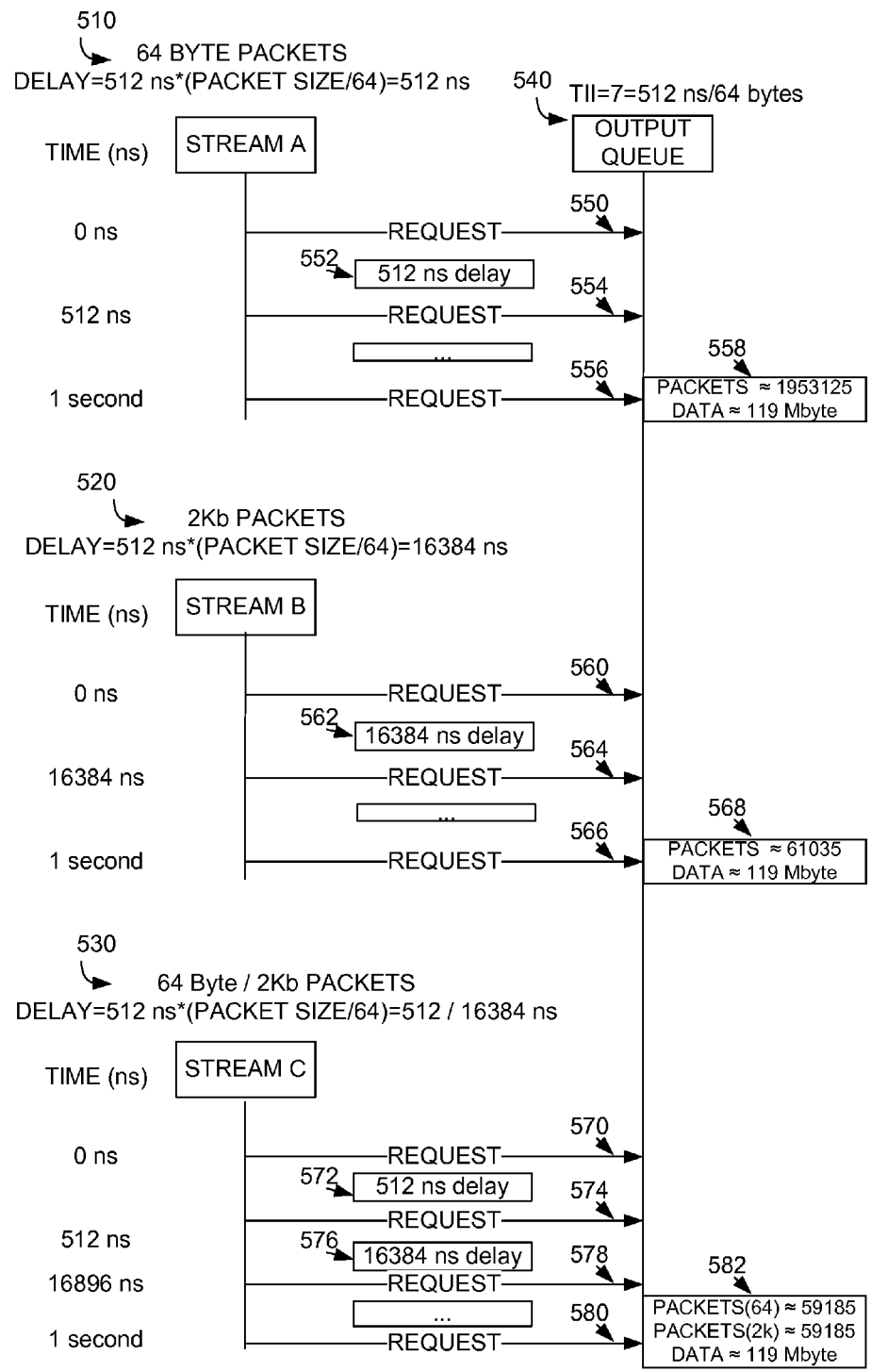
FIG. 5 depicts an example of bandwidth fair allocation.

FIG. 5 depicts an example of bandwidth fair allocation. Shown in FIG. 5 are three Streams, A 510, B 520, and C 530, that are all sending data to a single output queue 540. Stream A may be a stream of 64 byte packets, Stream B may be a stream of 2 Kbyte packets, and Stream C may be a stream of alternating 64 byte/2 Kbyte packets. The output queue may be currently operating with a Target Issue Interval value based on the output queue depth, which will be described further below. For purposes of this description, assume output queue 540 is operating with a TII value of 7. Based on the table described in FIG. 4, a TII value of 7 may specify a delay of 512 ns per 64 bytes of data that is being sent to the output queue.

Based on the delay specified by the Iii value, Stream A may delay 512 ns between each subsequent request, as Stream A is sending 64 byte packets. Likewise, Stream B may delay 16384 ns (512 ns * 2Kbyte packet/64bytes) between subsequent requests. The delay between subsequent request for Stream C may be determined based on the previous sent request. For example, if stream C sends a request for a 64 byte packet, there may be a delay of 512 ns before sending the next request. If the next request is for a 2 Kbyte packet, there may be a delay of 16384 ns before sending a subsequent request. The reason that the delay is based on the sent request message as opposed to the size of the data packet in the subsequent request message is that if a request for a large packet is sent, the output queue may be occupied. for a sufficiently large period, of time sending out the large packet, such that a relatively long delay can be introduced prior to sending the next request. The converse is not true. If a request for a small packet is sent, and then a relatively long delay is introduced, the output queue may run out of data to send.

As mentioned above, Stream A delays 512 ns between each subsequent request. Stream A may send a request 550 with an identified packet size of 64 bytes. Stream A may then delay 512 ns 552, as specified by the Tll value currently in effect. Stream A may then send a subsequent request message 554. This process may then repeat. As shown, after approximately one second. 556, Stream A may have sent requests for approximately 1,953,125 packets 558. Each packet may be 64 bytes long, resulting in a total amount of data transferred of approximately 119Megabytes (Mbyte).

Similarly, Stream B delays 16,384 ns between each subsequent request. Stream B may send a request 560 with an identified packet size of 2 Kbyte. Stream B may then delay 16,384 ns 562, as specified by the value currently in effect. Stream B may then send a subsequent request message 564. This process may then repeat. As shown, after approximately one second 566, Stream B may have sent requests for approximately 61,035 packets 568. Each packet may be 2Kbyte long, resulting in a total amount of data transferred of approximately 119Megabytes (Mbyte).

Stream C operates generally the same as Streams A and B. However the inter request message delay of Stream C is determined based on the size of the data packet in the previous request message. As shown, Stream C may send a request message 570 for a data packet that is 64 bytes long. A 64 byte data packet results in a 512 ns delay 572. Stream C may then send a request 574 for a 2 Kbyte data packet. A 2 Kbyte data packet results in a delay 576 of 16,384 ns. After this delay, Stream C may send a request 578 for a 64 byte data packet. Stream C may then delay 512 ns based on the packet size. This process may then repeat. As shown, after approximately one second 580, Stream C may have sent requests for approximately 59,185 64 byte packets and 59,185 2 Kbyte packets 582. The resulting total amount of data transferred is approximately 119 Megabytes (Mbyte).

What should be understood is that for a given TII value, each stream is allowed to send approximately the same amount of data, regardless of the size of the data packets that are to be sent. Thus, the available bandwidth is allocated in a bandwidth fair manner, such that no stream is allowed to send more data than another stream. This bandwidth fair allocation assures that no stream is allowed to occupy a disproportionate amount of space in the output queue. By normalizing the delay based on the size of the data packet to be transferred, each stream is allowed to transfer the same amount of data for a given TII value, regardless of the size of the data packets that make up that stream.

Figure 6:
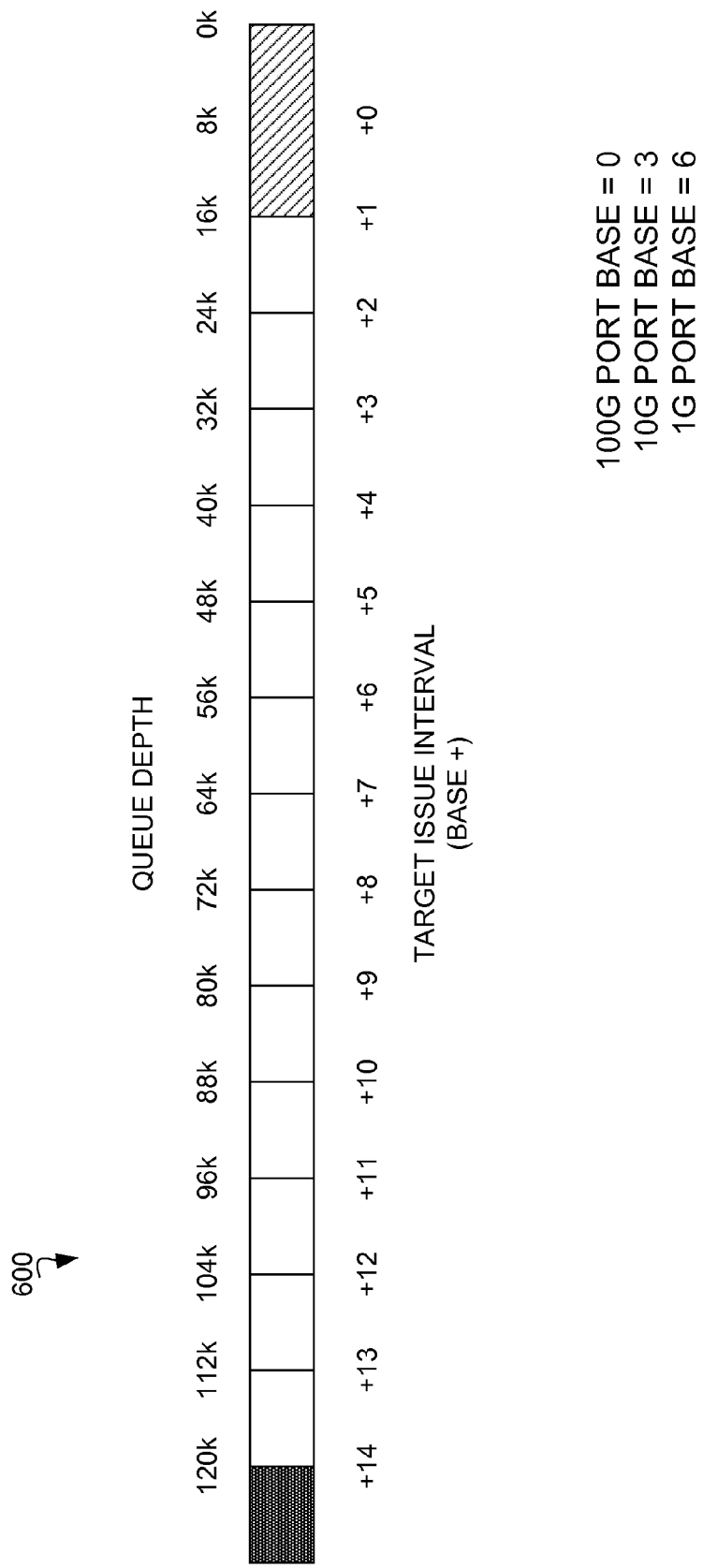
FIG. 6 depicts an example of an output queue.

FIG. 6 depicts an example of an output queue, which may also be referred to as an uncompressed output queue. A description of a compressed output queue is presented with respect to FIG. 10. As mentioned above, every output port on a destination node may be associated with an output queue 600. As packets are received by the destination node, the packets may eventually be placed in an output queue for transmission out of the networking device. The queue may be implemented as a first in first out (FIFO) queue. Although the output queue shown in FIG. 6 is depicted as a single, contiguous region of memory, it should be understood that this is only an example implementation. In other example implementations, the output queue may be distributed to non-contiguous regions of memory. For example, in some example implementations, the output queue may be implemented as a linked list, with the links maintaining the FIFO nature of the queue.

Regardless of implementation, at any given time, an output queue may have a depth. The depth of the output queue indicates how much of the available storage space within the queue is currently in use. The sizes of the data packets within the output queue are not important, but rather what should be noted is that the depth indicates the total amount of the queue that is currently in use. The output queue may be divided up into several segments. As shown, the output queue may be divided into segments of 8 Kbyte, however this particular segmentation is for purposes of description only. The actual determination of the segmentation may be a parameter that is configured by a system administrator when configuring the networking device.

Assigned to some of the segments may be Target Issue Interval values. In some implementations, the TII values are assigned as increments over the base rate for the output queue, as was described above. As shown, beginning with the segment beginning at a queue depth of 16 Kbyte, a TII value of +1 is assigned. Thus, at a queue depth of 16 Kbyte a TII value of the base rate +1 may be assigned to that transition point. Likewise, there may be transition points for TII values corresponding with each of the defined segments.

In operation, a queue may initially be empty, and thus have a depth of 0 Kbyte. As request messages are received and accepted, space equivalent to the identified size of a packet in the request message is allocated for the eventual receipt of the data packet. This allocated space is thus considered in use by the output queue because it will be used once the data packet arrives and is added to th.e queue. If request messages are accepted and space is allocated at a rate faster than data packets within the queue can be transmitted from the output port and free up space within the queue, the queue depth will begin to grow. The reason for this is that more space within the queue is being allocated for receipt of data packets than space is being made available by data packets leaving the queue. Up to a certain point, such queue growth is not an issue, and may in fact be desirable as it ensures that the output queue may not be starved for data to be transmitted. As shown, up to the 16 Kbyte point, any growth in the output queue may be considered acceptable, and as such the input streams may not be limited in the amount of data that can be offered (to the extent that the base rate allows). However, at a certain point, it may be determined that the depth of the output queue is larger than desired to maintain a sufficient backlog of data to be output. Once a sufficient level of backlog has been achieved. the rate of growth. may be limited, For purposes of the remainder of the description of FIG. 6, it is assumed that the output port is a 100G port, and thus the base value is zero.

As shown, at the 16 Kbyte transition point, a TII value of one has been assigned. If the queue depth crosses this transition point, the TII value that may be sent in the response messages for this output queue may indicate that the TII value for the output queue is one. When a source node receives the value in the response message, the source node may update the current TII table to reflect the value of the TII. As the queue depth increases, additional transition points with a greater TII value may be crossed, and thus a higher value of a TII may be reported to the source node. Likewise, as the depth of the queue decreases, transition points with a lower TII value are crossed, and a correspondingly lower TII value may be reported. As mentioned above, and will be described in further detail below, the TII value determines the rate that streams are allowed to send data packets to the output queue.

As shown in FIG. 6, at some point the queue may reach a point where the depth can no longer increase. For example, an actual implementation of an output queue cannot have an infinite depth, as there cannot be an allocation of an infinite amount of memory for the queue. Thus, an output queue may be capped at a maximum depth, which may correspond to the maximum amount of memory that has been allocated for the output queue. As shown in FIG. 6, the output queue may have been limited to a maximum depth of 128 Kbyte. At a point just prior to this maximum depth, for example 120 Kbyte, the TII interval may be selected to be sufficiently high to allow for the output queue to drain. Should the output queue grow to a depth where additional request messages cannot be accepted because there is no space available in the output queue, the response message may indicate that the request is being refused and the data packet is not sent to the destination node. Use of the TII values is described in further detail below.

Figure 7A:
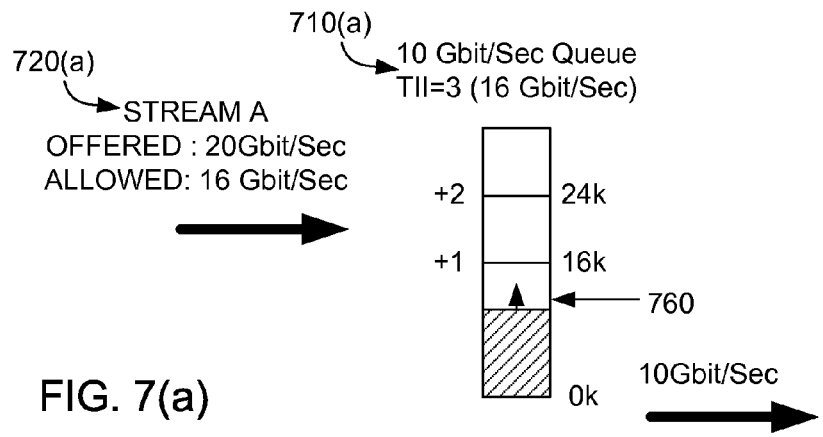
FIGS. 7(a-c) depict an example of output queue stabilization.
Figure 7B:
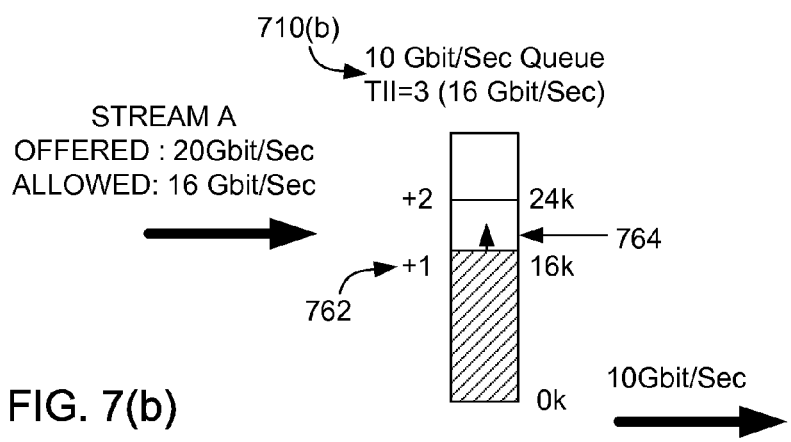
Figure 7C:
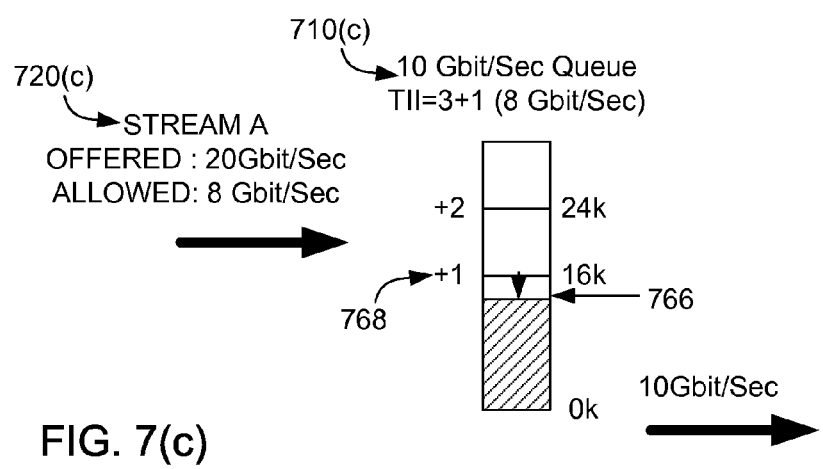

FIGS. 7(*a-c*) depict an example of output queue stabilization. Shown in FIG. 7(*a*) is a 10 Gbit/sec output queue 710(*a*). As described above, a 10 Gbit/sec output queue may initially limit the amount of traffic it may request to more closely conform with the output capabilities of its associated I/O port. As such, the TII for the output queue may be set to 3, which corresponds to an effective bandwidth of 16 Gbit/sec. Also shown is stream A 720(*a*) which has data to offer at a rate of 20 Gbit/sec. Because the initial TII is set to 3, the amount of traffic allowed will be limited to 16 Gbit/sec. Stream A may begin sending request messages to the output queue with an effective bandwidth of 16 Gbit/sec. Because the output queue 710 is a 10 Gbit/sec queue, the depth of the queue may begin to climb 760. The reason for this is that traffic may be coming into the queue at a rate of 16 Gbit/sec but can only leave the queue at a 10 Gbit/sec rate.

As the depth of the output queue continues to increase, at some point the depth will cross a boundary where the TII is changed. As shown in FIG. 7(*b*), at a queue depth 710(*b*) of 16 Kbyte, the TII is to be increased by one 762. However, due to the delay in communicating the TII back to stream A, the stream may continue to issue requests at the higher rate for a period of time, causing the queue to further increase in depth 764. As shown in FIG. 7(*c*), the new TII of 3+1 may be received by the sending node. Stream A 720(*c*) may then reduce the rate of request messages resulting in an allowed effective bandwidth of 8 Gbit/sec, which corresponds to a TII of value 4. As such, the output queue 710(*c*) may begin to decrease 766. The reason for this is that data may now be coming in at a rate of 8 Gbit/sec but is leaving the queue at a rate of 10 Gbit/sec.

At some point, the queue depth will again drop below a TII transition point. As shown, the depth of the output queue may eventually drop below the transition point at 16 Kbyte 768. As such, output queue may return to the initial TII value of 3 which may allow data at a rate of 16 Gbit/sec again. As such, the queue will begin to grow in depth again, as was shown in FIG. 7(*a*). The depth of the output queue will thus stabilize at around the 16 Kbyte point by dithering about that point. As such, the output queue has thus been stabilized.

Figure 8A:
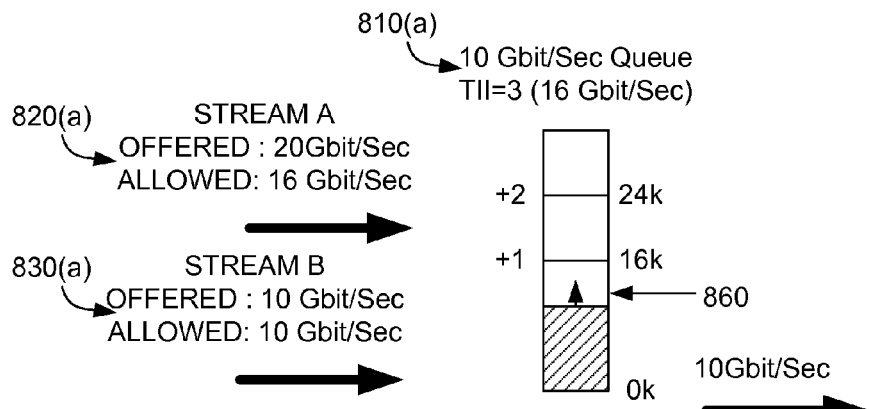
FIGS. 8(a-c) depict another example of output queue stabilization.
Figure 8B:
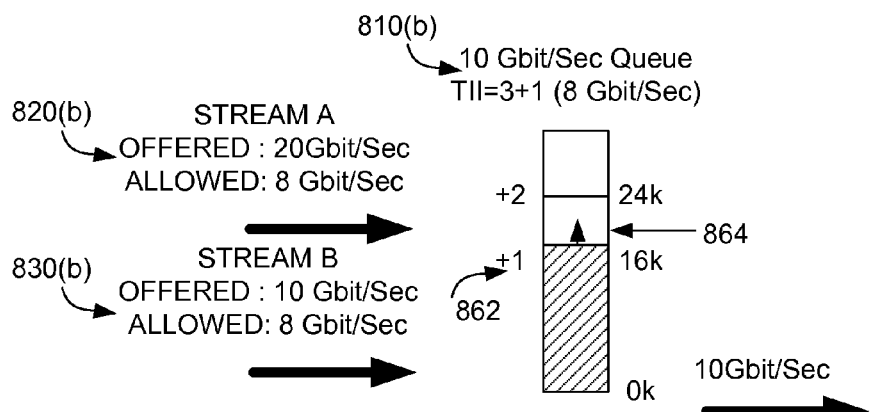
Figure 8C:
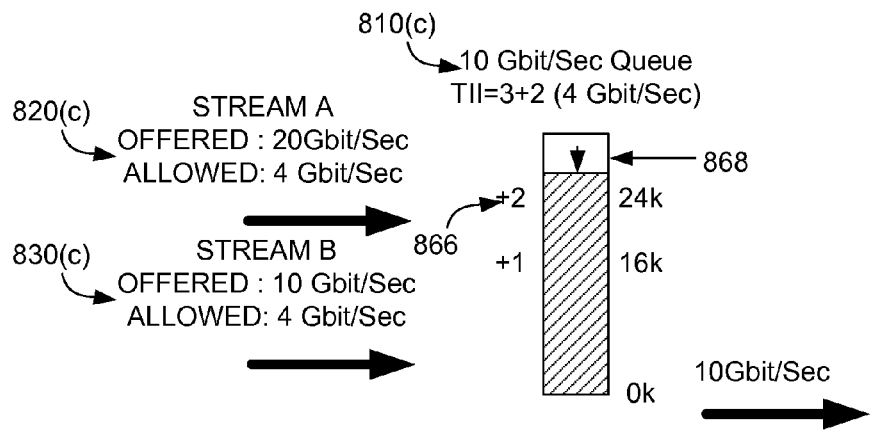

FIGS. 8(*a-c*) depict another example of output queue stabilization. FIG. 8 may be thought of as a continuation of FIG. 7, with the addition of a second stream. Just as above, output queue 810(*a*) may operate at 10 Gbit/sec, with an initial TII of 3, resulting in communication of an allowed bandwidth of 16 Gbit/Sec. Stream A 820(*a*) may again be a 20 Gbit/sec stream, which is limited to 16 Gbit/sec by the TII of 3 currently in effect. Stream B 830(*b*) may be a 10 Gbit/sec stream. Because the current value of the TII allows traffic at a 16 Gbit/sec rate, and stream B is only offering 10 Gbit/sec of traffic, stream B is initially unrestricted. The queue depth of the output queue may begin to increase 860. The reason for this is that the combined rate of data coming into the output queue from both streams is 26 Gbit/sec, while the queue is draining at a rate of 10 Gbit/sec.

As the depth of the output queue continues to increase, at some point the depth will cross a boundary where the TII is changed. As shown in FIG. 8(*b*), at a queue depth 810(*b*) of 16 Kbyte, the TII is to be increased by one 862. The new TII may be communicated back to Stream A 820(*b*) and Stream B 830(*b*). As such, both of the streams may reduce the rate of traffic being sent to the output queue to 8 Gbit/sec from each stream, in accordance with a TII value of 4. However, even at the reduced rate, the combined traffic is still 16 Gbit/sec, which is greater than the 10 Gbit/sec output rate of the output queue 810(*b*). As such, the depth of the queue may continue to rise 864, albeit at a slower rate than before.

As the depth of the output queue continues to increase, at some point the depth will cross the next boundary where the is changed. As shown in FIG. 8(*c*), at a queue depth. of 24 Kbyte, the TII value is two 866. Thus, a value of two may be added to the base value, resulting in a value of 5. Output queue 810(c) may then communicate the new III value of 5, which corresponds to a data rate of 4Gbit/sec to Stream. A 820(*c*) and Stream B 820(*c*). Those streams may then reduce the rate at which data is sent to 4Gibt/sec each, resulting in a combined rate of traffic of 8Gbit/sec. Because the output queue 810(*c*) is draining at a rate of 10Gbit/sec and the traffic is coming in at a rate of 8Gbit/sec, the depth of the output queue will begin to drop 868. Just as above, the queue depth will continue to drop until, the transition point 866 at 24 Kbyte is passed. The TII may then be reduced to again allow traffic at the 8Gbit/sec rate, which was described in FIG. 8(b). The depth of the output queue will thus stabilize at around the 24 Kbyte point by dithering about that point. As such, the output queue has thus been stabilized.

Although only two streams are shown in FIG. 8, the techniques described herein are applicable regardless of the number of streams. The TII value may be determined based on the depth of the output queue, regardless of how many streams are sending data packets. If additional streams were to begin sending data packets to the output queue, the depth would again begin to increase, resulting in a higher TII value and hence further limiting the rate at which each stream may send data. Likewise, if a stream discontinues sending data to the output queue, the queue depth may begin to decrease, resulting in a lower TII value, which in turn will allow the remaining streams to send data at a higher rate. Furthermore, it should be noted that the size of the packets being sent by each stream is not relevant. As was explained with respect to FIG. 5, the techniques described herein ensure a fair distribution of the available bandwidth to all participating streams.

Figure 9A:
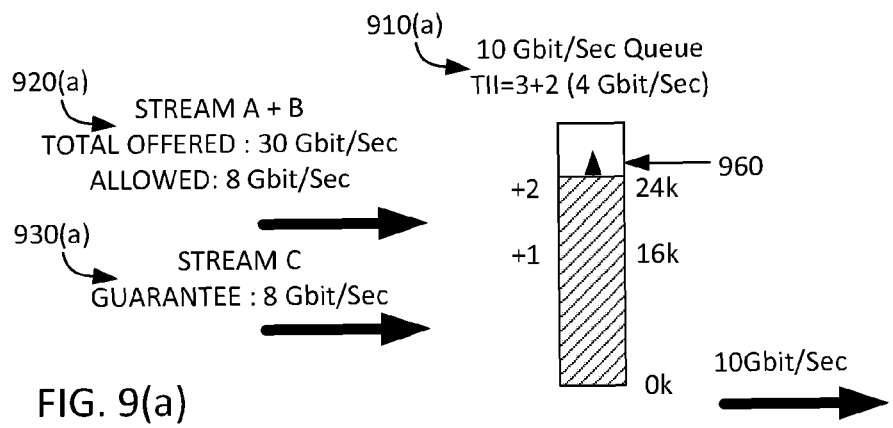
FIGS. 9(a-c) depict another example of output queue stabilization.
Figure 9B:
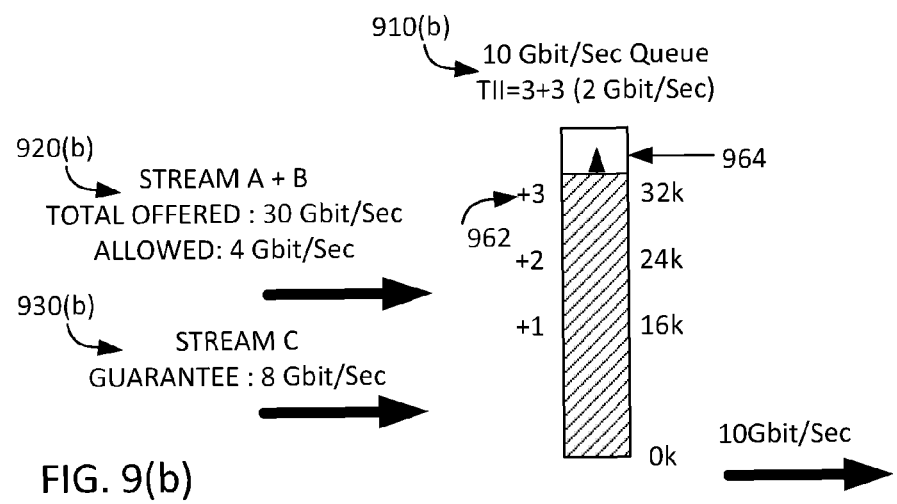
Figure 9C:
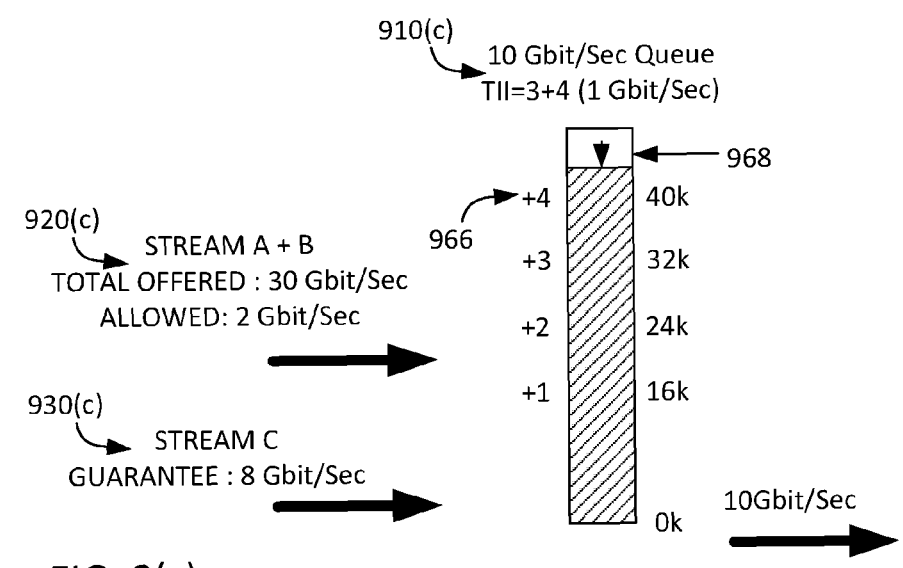

FIGS. 9(a-c) depict another example of output queue stabilization. FIG. 9 may be thought of as a continuation of FIG. 8, with the addition of a third stream. Just as above, output queue 910(a) may operate at 10 Gbit/sec. Continuing from FIG. 8, the TII value may be 5, resulting in communication of an allowed bandwidth of 4 Gbit/Sec per stream. For purposes of ease of description, Streams A and B have been shown as a combined stream 920(a), with a total offered date rate of 30 Gbit/sec. Based on the III value currently in use, the output queue is requesting data at a rate of 4 Gbit/sec per stream, resulting in an allowed bandwidth of 8 Gbit/sec from the combination of Streams A and B.

A new stream, Stream C 930(a), may begin sending data to the output queue. However, Stream C may be a stream with a guaranteed bandwidth. As such, Stream C may ignore the TII value and send data at the rate that has been guaranteed. There are many reasons why a stream may be guaranteed a certain level of bandwidth, such as because the stream contains high priority traffic. Regardless of the reason why a stream is granted a guaranteed bandwidth, it should be understood that such a guarantee is a system administrator configured parameter.

As shown, Stream C 930(a) has a guarantee of 8 Gbit/sec and is sending data to the output queue at that rate. Because of the guarantee, Stream C does not limit the rate of traffic based on the current TII value. Because the total amount of data coming into the output queue is now 16 Gbit/sec (8 Gbit/sec from Streams A and B plus 8 Gbit/sec from stream C), the depth of the output queue may begin to rise 960. At some point, the depth of the queue will rise past the next TII value transition point 962. As shown in FIG. 9(b), the output queue 910(b) will eventually rise past the 32 Kbyte point, resulting in a new TII value of 6, which results in an allowed data rate of 2 Gbit/sec per stream.

Accordingly, streams A and B 920(b) reduce their rate of data to 2 Gbit/sec each, resulting in an overall bandwidth of 4 Gbit/sec for those two streams. However, Stream C 930(b) has a guaranteed bandwidth of 8 Gbit/sec, and as such does not decrease the amount of data being sent to the output queue. This results in a total bandwidth entering the output queue of 12 Gbit/sec (4 Gbit/sec from Streams A and B and 8 Gbit/sec from Stream C). As the rate of data coming in is greater than the 10 Gbit/sec output rate of the queue, the output queue continues to grow 964.

The depth of the output queue 910(c) will eventually pass the next TII value transition point. As shown, the next transition point 966 at 40 Kbyte results in a TII value of 7, which results in a data rate of 1 Gbit/sec. Streams A and B 920(c) may conform to the new data rate and thus begin sending data at a combined rate of 2 Gbit/sec. Again, Stream C 930(c) is exempt from complying with the TII value due to the bandwidth guarantee. Stream C continues to send data at the 8 Gbit/sec rate, resulting in a combined rate from all three streams of 10 Gbit/sec. As this is the same as the data rate of the output queue, the queue will stabilize about this point 968.

The principles described with respect to FIG. 9 may also be applicable to other cases, such as setting an upper bound or a bias for a particular stream. For example, a system policy may be specified that a particular stream may only send request messages at a specified rate, regardless of the rate allowed by the output queue. For example, a policy may state that a stream should send request messages at a rate corresponding to a TII of 5 or higher. Thus, the stream may send request messages at the specified TII value or greater, regardless of the TII value reported by the output queue, effectively putting a cap on the rate that the stream may send request messages.

A policy may also specify that a stream should be given a proportionally greater/smaller share of the available bandwidth. For example, a policy may specify that a given stream should be granted twice the bandwidth of all other streams. Thus, the stream may use a TII value that is one less than the TII requested by the output queue. Conversely, a stream that is to be granted half the share of the available bandwidth may add a value to the TII requested by the output queue. The techniques described above allow compensation for output queues that do not comply with the requested TII.

FIGS. 10(a-b) depict an example of a compressed output queue. In some example implementations, it may be beneficial to maintain the full range of possible III values and associated transition points, while using an output queue that is of a smaller size. For example, in the output queue described with respect to FIG. 6, transition points were established every 8 k, with an overall possible queue depth of 128 k. It may be desirable to maintain the behavior of the uncompressed output queue, while using a smaller amount of memory for the queue. One reason this may be useful is that it may allow a system administrator to better manage the latency that is present with long output queues.

For example, assuming 64 byte packets, a full 128 k queue would contain 2048 data packets. The $2048^{th}$ data packet in the queue cannot be sent until the preceding 2047 data packets are sent. If the output queue is associated with a 1 Gbit/sec output port, transmitting 2047 data packets of 64 bytes each may take approximately 1 millisecond (ms). Such a delay may be unacceptable in certain applications. For example, in applications involving real time traffic such as voice traffic, it may be better to discard a packet rather than endure the associated delay.

Another reason why a compressed queue may be used is that the dynamic range in the data rate that can be assigned to a stream may be greater than would be practical to implement using an uncompressed queue. For example, using the range of data rates described with respect to FIGS. 4 and 8K byte segments may require approximately 128 kBytes of queue space. The same range of date rates using 32 Kbyte segments may require approximately 512 Mbytes of queue space. A tradeoff would be needed in that either enough space may need to be made available for the uncompressed queue or the range of possible data rates may need to be limited. Using a compressed queue may allow a wide range of possible data rates without the need for increases in the space used by the queue.

The compressed queue shown in FIGS. 10(a-b) allow for the transition points of an uncompressed queue while at the same time limiting the amount of space, thus the depth, that is actually required for the queue, thus reducing the output queue latency. The compressed queue takes advantage of the fact that at any instant in time, only a small portion of the output queue is active. The compressed queue may be a queue that is smaller than the uncompressed queue and forms a window that maps to a portion of the uncompressed queue. As the depth of the compressed queue increases, the window may slide further up the uncompressed queue. As the depth decreases, the window may slide further down.

For example, shown in FIG. 10(a) is an uncompressed queue 1010 and a compressed queue 1020. The uncompressed queue may have a maximum possible depth of 80 k, broken into 5 separate zones. The first zone 1012 may map to the portion of the uncompressed queue corresponding to the portion of the uncompressed queue wherein no limitations on the TII value (other than the optional base rate) are in effect. In essence, if the depth of the compressed queue is in the first zone, there is no further limiting of the amount of data a stream may send.

Conversely, there may be a fifth zone 1014 that maps to the portion of the uncompressed queue in which the queue is essentially full and no additional data packets may be accepted. When the depth of the compressed queue enters the fifth zone, further acceptance of data packets may be denied.

Operation of the compressed queue becomes more interesting when it is operating in zones two through four. For example, assume that the compressed queue initially maps to the beginning of the uncompressed queue. As shown, the compressed queue is 80 k long. Thus, this maps to the first 80 k of the uncompressed queue. Several streams may begin sending data packets to the compressed queue at an extremely high rate. For purposes of this example, assume that data is arriving so quickly that the depth of the compressed queue jumps into the zone four 1016 range. Operation in zone four may indicate the need to slide the window further along the uncompressed queue toward higher TII values.

For example, as the queue depth enters zone four, the window may be slid down the uncompressed queue an amount equal to the size of the data packet in the last received request message. In other example implementations, the window may be slid an amount equal to a multiple of the size of the last received request message. For purposes of this example, assume that the compressed queue has been operating in zone four for a period, of time that results in a need. to slide th.e window by approximately 10 Kbyte. In other words, there may be an offset 1022 of 10 Kbyte of the compressed queue from the uncompressed queue. FIG. 10(a) depicts the compressed queue with the offset applied. When the next request for a data packet is received, the depth of the compressed queue may be determined. It may then be determined to which portion of the uncompressed queue that depth of the compressed queue maps. For example, if the current offset is 10 Kbyte, zones two through four the compressed queue maps to the portion of the uncompressed queue between 26 Kbyte and 58 Kbyte. If the depth of the compressed queue is 40 Kbyte, this maps to an uncompressed queue depth of 56 Kbyte. As shown, the TII value for an uncompressed queue depth of 56 Kbyte is 6. As such, the output queue will report a value of 6 as the current TII value.

As additional requests are received, the data rate offered should decrease based on the TII value. However, should the rate not decrease, for example because of a guaranteed bandwidth stream as described above, the compressed queue may continue to operate in zone four, and thus will continue to be slid further and further down the uncompressed queue. For example, at an offset of 30 Kbyte, zones two through four of the compressed queue would map to the portion of the uncompressed queue between 46 Kbyte and 78 Kbyte. A compressed. queue depth of 40 Kbyte at a 30 Kbyte offset would. result in an uncompressed queue depth of 76 Kbyte. As shown, the TII value for an uncompressed queue depth of 76 Kbyte is 8, which may result in the streams sending data to the compressed output queue to further reduce the rate at which they send requests.

At some point, the rate of incoming request messages may reduce to the point where the depth of the compressed output queue enters zone three 1018. Zone three may be considered a stabilized queue depth, in that the window will neither be slid upwards nor downwards. Thus, as long as the depth of the compressed output queue remains in zone three, the window remains at the current offset.

The rate of incoming request messages may reduce to the point where the depth of the compressed output queue enters zone two 1020. Queue depths in zone two may indicate that the window may need to be slid up the uncompressed output queue, toward lower TII values. The reason for this is that operation in zone two may indicate that the queue is draining faster than it is filling. Thus, in order to ensure that streams are able to send data at the highest possible rate, the window may need to be slid toward lower TII values, allowing the streams to send data at a higher rate. In one example implementation, the amount of time spent in zone two may determine how far up the uncompressed queue the compressed queue should be slid. For example, the window may be slid toward lower TII values by decreasing the offset by 1 Kbyte for every 10 ns the compressed output queue remains in zone two. There are two potential outcomes from sliding the window further up the uncompressed queue. The first is that the lower TII values resulting from sliding the window up will cause the depth of compressed queue to move into zone three, due to the increased data rate allowed by lower TII values. The second possible outcome is that the depth of the compressed queue continues to decrease until the queue begins operation in zone one, wherein the TII is only limited by the base rate of the output queue.

As should be clear, decreasing the offset causes the compressed output queue to slide further up the uncompressed queue toward lower TII values. As such, the streams may be allowed to send request messages at a higher rate. If the depth of the compressed output queue continues to decrease, the offset may eventually reach zero. At that point, further decreases would result in operation of the compressed output queue in zone one. In some cases, the compressed output queue may drain so quickly that operation in zone two does not have sufficient time to slide the window up and operation jumps into zone one. In such a case, the offset may be returned to zero. Furthermore, it may be possible for the compressed output queue to remain in zone two with an offset of zero without dropping into zone one. As mentioned above, operation in zone one indicates no reduction in the rate at which request messages may be sent.

Figure 11:
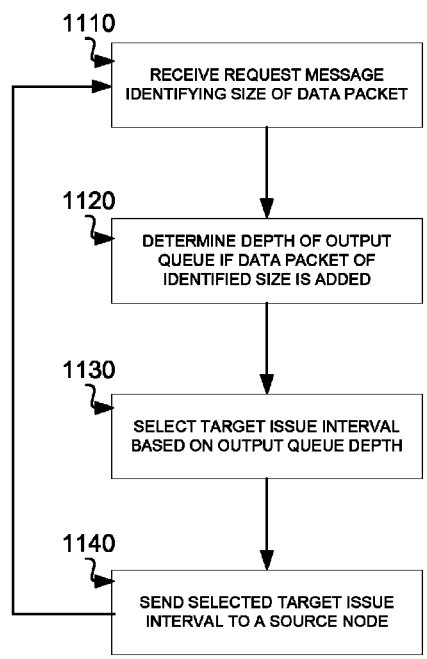
FIG. 11 is an example of a high level flow diagram for an output queue.

FIG. 11 is an example of a high level flow diagram for an output queue. In block 1110, a request message identifying the size of a data packet may be received. The request message may identify a data packet that will be sent from a source node for addition to the output queue. In block 1120, the depth of the output queue if a data packet of the identified size is added may be determined. As mentioned above, the request message identifies a data packet that may be sent to the output queue, but does not actually include the data packet. The output queue determines how deep the queue will become if a data packet of the identified size is added.

In block 1130, a Target Issue Interval may be selected based on the depth of the output queue. As described above, there may be a mapping of queue depths to TII values. Once a queue depth has been determined, the value of the TII may be selected from the mapping. In block 1140, the selected TII value may be sent to the source node. As explained above, the TII value may be sent in a response message that is sent in response to the request message.

Figure 12:
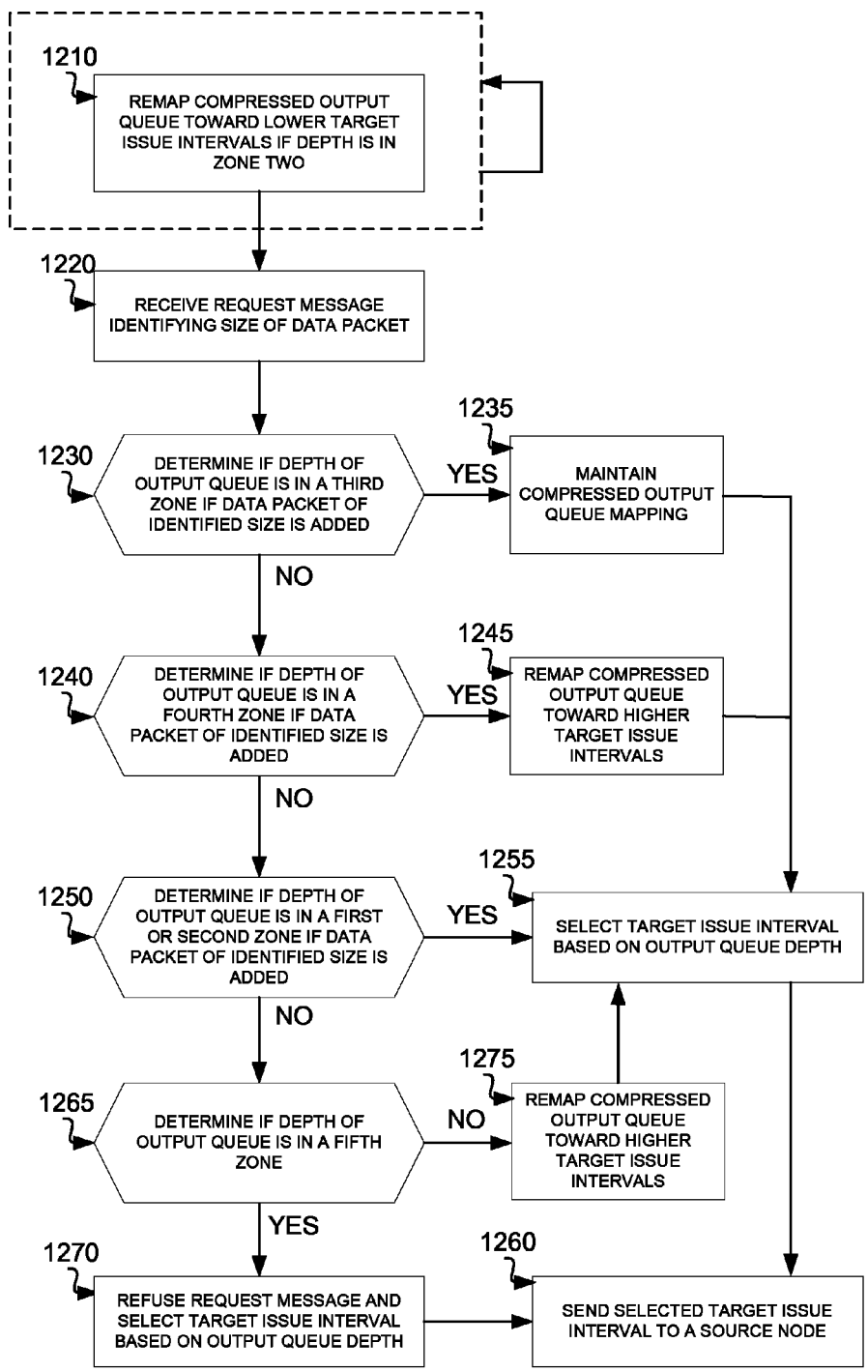
FIG. 12 is an example of a high level flow diagram for a compressed output queue.

FIG. 12 is an example of a high level flow diagram for a compressed output queue. In block 1210 the compressed output queue is remapped toward lower TII values if the depth is in zone two. Block 1210 is independent of receiving request messages. As data packets exit the output queue, the queue depth decreases. If the resulting queue depth is in zone two, the compressed output queue may be remapped toward lower TII values. Block 1210 may continue until the compressed output queue has been remapped to the point where the offset is zero.

In block 1220 a request message identifying the size of a data packet may be received just as above with respect to FIG. 11. In block 1230 it may be determined if adding a data packet of the identified size will result in a depth of the output queue in a third zone. If so, the process moves to block 1235, wherein the compressed output queue maintains the current mapping to the uncompressed TII values. As described above, operation in zone three indicates that the output queue is in a stable zone and as such, there is no need to remap the compressed output queue. In block 1240 it may be determined if adding a data packet of the identified size will result in a depth of the output queue in a fourth zone. If so, the process moves to block 1245, wherein the compressed output queue is remapped toward higher Target Issue Intervals. As described above, operating with a queue depth in zone four results in sliding the window toward less data flow and thus higher TII values.

In block 1250 it may be determined if adding a data packet of the identified size will result in a depth of the output queue in a first or second zone. If the output queue is operating in any of zones one through four, block 1255 may be executed. In block 1255, a TII value may be selected based on the output queue depth. In other words, once the compressed queue has been remapped (if needed) to the correct portion of the uncompressed queue, the value of the TII may be selected by determining where the queue depth on the compressed queue maps to the uncompressed queue. In block 1260, the selected Target Issue Interval may be sent to a source node. The source node may then update its Target Issue Interval table to indicate the selected value of the TII. This value may then be used when sending subsequent request messages.

In block 1265, it may be determined if the depth of the compressed output queue is in a fifth zone. It should be noted that in block 1265, the determination is based on the current depth of the compressed output queue, not the depth as it would be if the requested data packet is added. As described above, operation in a fifth zone indicates that the queue is full and no additional data packets may be accepted. If the compressed output queue is in the fifth zone, the process moves to block 1270 wherein the request message is refused. Otherwise, this means that although the depth of the compressed queue is not currently in the fifth zone, the addition of the data packet in the request message will result in the queue entering the fifth zone. The process moves to block 1275 wherein the compressed queue is remapped toward higher target issue intervals. In either case, the Target Issue Interval may be selected and sent to the source node as described above.

Figure 13:
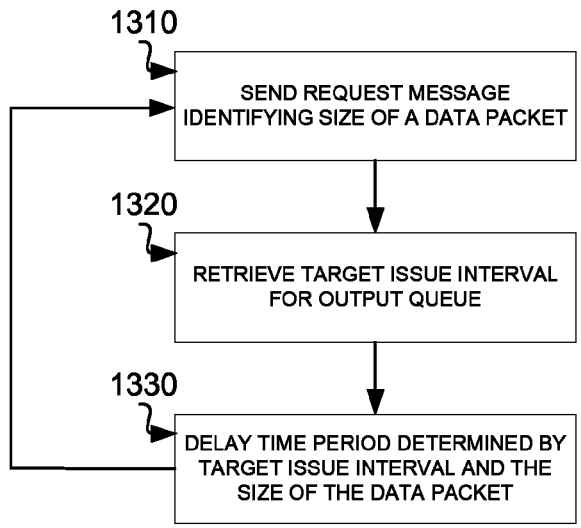
FIG. 13 is an example of a high level flow diagram for delaying based on Target Issue Intervals.

FIG. 13 is an example of a high level flow diagram for delaying based on Target Issue Intervals. In block 1310 a request message identifying the size of a data packet may be sent to an output queue on a destination node. The size of the data packet may be used by the output queue to determine how much space in the output queue may be needed by the data packet. In block 1320, a Target Issue Interval for the output queue may be received. The TII value may be retrieved from a data structure maintained on the node that is sending the request message. As described above, the TII value retrieved may be the last TII value that was received for the output queue by the source node.

In block 1330, a delay may be inserted prior to sending a subsequent request message. The delay time period may be determined based on the TII value and the size of the data packet. As described above, each TII value may correspond to a certain delay per byte of data. Using the TII value, the per byte delay may be retrieved. The actual delay to insert may be determined based on the TII value and the size of the data packet that was identified in the request message.

Figure 14:
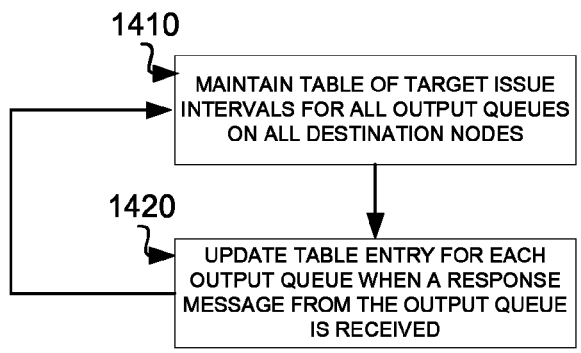
FIG. 14 is an example of a high level flow diagram for maintaining Target Issue Intervals.

FIG. 14 is an example of a high level flow diagram for maintaining Target Issue Intervals. In block 1410 a table of Target Issue Intervals for all output queues on all destination nodes may be maintained. Thus, the table may contain entries for every possible output queue within the networking device. In block 1420, the table entry for each output queue may be updated when a response message from the output queue is received. As explained above, the table may be updated whenever a response to a request message is received by a source node. It does not matter to which stream the response was directed.

I claim:

1. A method comprising:
    receiving, by a destination node from a source node, a first request message identifying a first size of a first data packet, the destination node including an output queue;
    determining a first target issue interval based on a first depth of the output queue and the first size;
    transmitting, by the destination node to the source node, a response message specifying the first target issue interval and whether or not the first data packet is to be sent; and
    maintaining a mapping of output queue depths to target issue intervals, wherein the first target issue interval is selected from the mapping.

2. The method of claim 1 wherein the output queue is a compressed output queue that maps to a portion of the mapping of output queue depths to target issue intervals.

3. The method of claim 2 further comprising:
    determining whether or not the first depth is in a first zone of the compressed output queue; and
    in an event in which the first depth is determined to be in the first zone, selecting the first target issue interval so that it corresponds to an output data rate of the compressed output queue.

4. The method of claim 2 further-comprising:
    determining whether or not the first depth is in. a second zone of the compressed output queue; and
    in an event in which the first depth is determined to be in the second zone, remapping the compressed output queue toward. lower target issue intervals.

5. The method of claim 2 further comprising:
    determining whether or not the first depth is in a third zone of the compressed output queue;

in an event in which the first depth is determined to be in the third zone, maintaining a current mapping of the compressed output queue; and selecting the target issue interval based on the current mapping of the compressed output queue.

6. The method of claim 2 further comprising:

determining whether or not the first depth is in a fourth zone of the compressed output queue;

in an event in which the first depth is determined to be in the fourth zone, remapping the compressed output queue toward higher target issue intervals; and selecting the target issue interval based on the remapped compressed output queue.

7. The method of claim 2 further comprising:

determining whether or not the first depth is in a fifth zone of the compressed output queue; and in an event in which the first depth is determined to be in the fifth zone, sending a response indicating the request message is refused.

8. The :method of claim 2 further comprising:

determining which zone of plural zones the first depth is in, the plural zones including a first zone, a second zone a third zone, a fourth zone and a fifth zone, the first zone, the second zone, the third zone, the fourth zone, and the fifth zone corresponding to respectively greater queue-depth ranges;

in an event in which the first depth is determined to be in the first zone, selecting the first target issue interval so that it corresponds to an output: data rate of the compressed output queue;

in an event in which the first depth is determined to be in the second zone, remapping the compressed output queue toward lower target issue intervals;

in an event in which the first depth is determined to be in the third zone,
maintaining a current mapping of the compressed output queue; and
selecting the target issue interval based on the current mapping of the compressed output queue;

in an event in which the first depth is determined to be in the fourth zone,
remapping the compressed output queue toward higher target issue intervals; and
selecting the target issue interval based on the remapped compressed output queue; and in an event in which the first depth is determined to be in the fifth zone, sending a response indicating the first data packet is refused.

9. The method of claim 1 further comprising transmitting, by the source node to the destination node, a second request message identifying a second size of a second data packet, the transmitting of the second request message occurring at a time determined at least in part based on the first target issue interval.

10. A method comprising:

retrieving, by a source node, a first target issue interval for a destination node;

sending, from a source node, a first request message identifying a size of a data packet, to a destination node having an output queue, the sending occurring at a first time based in part on the first target issue interval;

receiving, by the source node, a first response message from the destination node, the first response message specifying a second target issue interval for the destination node and specifying whether or not the packet is to be sent; and storing the second target issue interval;

wherein retrieving a first target issue interval comprises:
maintaining a table of target issue intervals for all destination nodes, wherein the table entry for each output queue is updated when a response message from the output queue is received; and
selecting the first target issue interval from the table based on the identity of the destination of the request message.

11. The method of claim 9 further comprising sending a second request message at a second time based in part on the second target issue interval.

12. The method of claim 11 further comprising adding an additional delay time as indicated by a system policy.

13. A device comprising hardware including memory, a processor, and logic, the memory, the processor, and logic cooperatively at least in part defining:

a queue module to maintain an output queue for a port on a destination node and to determine a target: issue interval based on a depth of the output queue, wherein the queue module maintains a mapping of queue depths to target issue intervals; and a response module to send, in response to a request message from a source node identifying a packet to be sent from the source node, a response message indicating the determined target issue interval to the source node and whether or not the packet is to be sent.

14. The device of claim .13 wherein the queue module further maps the depths to a compressed queue.

15. The device of claim 14 wherein the processor, the memory, and the logic further define, at least in part:

a target issue interval module to maintain target issue intervals for all output queues; and a request module to insert a delay based on the target issue interval prior to sending a request message.

16. The device of claim 13 wherein the logic, the memory, and logic further define, at least in part, a request module for transmitting a request message at a time based in part on a target issue interval provided by a destination node for the request message, the request message specifying a size of a packet to be transmitted from the device to the destination node.

* * * * *

UNITED STATES PATENT AND TRADEMARK OFFICE
CERTIFICATE OF CORRECTION

PATENT NO. : 8,908,711 B2  
APPLICATION NO. : 13/286391  
DATED : December 9, 2014  
INVENTOR(S) : Michael L. Ziegler Page 1 of 1

It is certified that error appears in the above-identified patent and that said Letters Patent is hereby corrected as shown below:

In the Claims

In column 16, line 37, in Claim 1, delete "front" and insert -- from --, therefor.

In column 16, line 60, in Claim 4, delete "in." and insert -- in --, therefor.

In column 16, line 64, in Claim 4, delete "toward." and insert -- toward --, therefor.

In column 17, line 21, in Claim 8, delete ":method" and insert -- method --, therefor.

In column 17, line 23, in Claim 8, delete "zone" and insert -- zone, --, therefor.

In column 17, line 30, in Claim 8, delete "output:" and insert -- output --, therefor.

In column 18, line 31, in Claim 13, delete "target:" and insert -- target --, therefor.

In column 18, line 39, in Claim 14, delete ".13" and insert -- 13 --, therefor.

Signed and Sealed this  
Nineteenth Day of May, 2015

Michelle K. Lee  
*Director of the United States Patent and Trademark Office*